United States Patent
Sandler et al.

(10) Patent No.: US 11,916,731 B2
(45) Date of Patent: Feb. 27, 2024

(54) IDENTIFICATION OF NODES INCLUDED IN A DISAGGREGATED SYSTEM

(71) Applicant: DRIVENETS LTD., Raanana (IL)

(72) Inventors: Evgeny Sandler, Herzliya (IL); Alexander Zilberman, Hadera (IL); Eran Israel Shecter, Givat Shmuel (IL); Idan Matityahu, Tel Aviv (IL)

(73) Assignee: DRIVENETS LTD., Raanana (IL)

( * ) Notice: Subject to any disclaimer, the term of this patent is extended or adjusted under 35 U.S.C. 154(b) by 0 days.

(21) Appl. No.: 18/004,264

(22) PCT Filed: May 31, 2021

(86) PCT No.: PCT/IL2021/050641
§ 371 (c)(1),
(2) Date: Jan. 4, 2023

(87) PCT Pub. No.: WO2022/009192
PCT Pub. Date: Jan. 13, 2022

(65) Prior Publication Data
US 2023/0198834 A1    Jun. 22, 2023

Related U.S. Application Data

(60) Provisional application No. 63/049,651, filed on Jul. 9, 2020.

(51) Int. Cl.
*H04L 41/0806*    (2022.01)
*H04L 41/12*    (2022.01)

(52) U.S. Cl.
CPC .......... *H04L 41/0806* (2013.01); *H04L 41/12* (2013.01)

(58) Field of Classification Search
CPC ..... H04L 41/0806; H04L 41/12; H04L 45/02; Y02D 30/00
See application file for complete search history.

(56) References Cited

U.S. PATENT DOCUMENTS

| 2004/0153573 | A1  | 8/2004 | Kim et al. |
| 2021/0194803 | A1* | 6/2021 | Zolkover ................ H04L 45/54 |
| 2022/0052845 | A1* | 2/2022 | Sherf ................... H04L 9/3263 |

OTHER PUBLICATIONS

Krayden, A., DriveNets Network Operating System (DNOS) Architecture, [Presentation] (Feb. 13, 2020). (Year: 2020).*
Krayden, A., DriveNets Network Operating System (DNOS) Architecture [Presentation] (Feb. 13, 2020) [online] retrieved from:drivenets.com/blog/disaggregation/a-recap-of-drivenets-at-networking-field-day// DriveNets Feb. 13, 2020 (Feb. 13, 2020) 1:52-1:54, 21:30, 22:34.

(Continued)

*Primary Examiner* — Chris Parry
*Assistant Examiner* — Dixon F Dabipi
(74) *Attorney, Agent, or Firm* — Browdy and Neimark, PLLC

(57) ABSTRACT

A disaggregated routing system is provided for use in a communication network comprising a plurality of white boxes, wherein at least four of the plurality of white boxes are each configured to carry out a functionality different from the functionalities which the other three of the at least four of the plurality of white boxes are configured to carry out, and wherein each of the at least four of the plurality of white boxes is identified based on its functionality.

12 Claims, 2 Drawing Sheets

(56) References Cited

OTHER PUBLICATIONS

Rtbrick: "Zero-touch Provisioning (ZTP) Guide", Nov. 25, 2019, XP093100970, URL:https://documents.rtbrick.com/ztp/ztp_guide_v2019.1.0_25nov2019.pdf.
Extreme Networks: "ExtremeXOS User Guide for Version 30.5 9036500-01 Rev AA March 2020", Mar. 1, 2020, XP093100969 URL:https://documentaion.extremenetworks.com/exos_30.5/downloads/EXOS-User-Guide-30_5.pdf.

* cited by examiner

IDENTIFICATION OF NODES INCLUDED IN A DISAGGREGATED SYSTEM

TECHNICAL FIELD

The present disclosure relates generally to the field of distributed computing. More specifically, it relates to the operation of a disaggregated system in a communication network.

Glossary

BOM—Bill of Materials;
CSP—Cloud Service Provider;
DDOS-distributed denial-of-service;
EC—Elements' Controller;
FM—Fabric Module;
MS—Management Switch;
DPF—Data Path Forwarder;
LLDP—Link Layer Discovery Protocol;
NC—Network Cloud;
NCR—Network Cloud Router;
NOS—Network Operating System;
ODM—Original Design Manufacturer;
ONIE—Open Network Install Environment;
OS—Operating System;
QOS—Quality of Service;
S/N—Serial Number;
SDN—Software Defined Network;
VPN—virtual private network;
WB—White-box;
WB-UID—White-box Unique Identifier
White Box—a commodity, being an open or industry-standard compliant hardware for switches and/or routers within the forwarding plane. White boxes provide users with the foundational hardware elements of a network.

BACKGROUND

A disaggregated (distributed) system is a system whose components are located on different networked computers, which communicate and coordinate their actions by forwarding messages to one another. The components interact with one another in order to achieve a common goal. Three significant characteristics of distributed systems are: concurrency of components, lack of global clock, and independent failure of components.

A computer program that runs within a distributed system is referred to as a distributed program. There are many different types of implementations for messages' conveying mechanism, among which pure HTTP, RPC-like connectors and message queues.

A computer cluster is a set of loosely or tightly connected computers that work together so that, in many respects, they can be viewed as a single entity. Unlike grid computers, computer clusters have each a node set to perform the same task, controlled and scheduled by a software.

The components of a cluster are usually connected to each other through fast local area networks, with each node (e.g., computer used as a server) running its own instance of an operating system. In most circumstances, all of the nodes use the same hardware and the same operating system, although in some setups (e.g., when. Open Source Cluster Application Resources (OSCAR) is implemented), different operating systems can be used on each computer, or different hardware.

Clusters are usually deployed to improve performance and availability over that of a single computer, while typically being much more cost-effective than single computers of comparable speed or availability.

The term Network Cloud (NC) refers to a cloud that is being used for serving network functionalities such as routing, switching, etc. In other words, the term refers to the concept of disaggregating network entities' hardware and software. The control plan of a network entity in an NC is decoupled from its data-path, and is installed on a local server or in the cloud network. An underlying abstraction layer separates the control element and makes it agnostic to the data-path related hardware components. The data-path runs on a distributed hardware resources such as servers, network interfaces and white box devices and may be programmed directly. Network cloud concept uses cloud methodology to serve Software Defined Network ("SDN") services such as routing, switching, VPN, QOS, DDOS mitigation and the like in a more efficient, centrally controlled and easily programmable way.

The separation that exists nowadays between software and hardware in the networking field, has resulted in a new model of a network cloud, wherein an optimized usage of hardware resources is implemented to enable deploying of a distributed network operating system. Currently, network operators are facing financial difficulties as the network elements' prices are relatively high per device and consequently the price is also high on a "per port" basis, whereas the income per subscriber remains mostly constant and, in some cases, even declines. Obviously, the above affects the profitability of the network owners and encourages them to look for ways to implement a cost reduction approach in their networks. Many network operators and large network owners, such as web-scale owners, have adopted the approach of implementing white-boxes, where a white-box is a hardware element that is manufactured by a silicon merchant (commodity chipsets) at ODMs. This approach allows network operators to use white boxes manufactured by different manufacturers within the same distributed network cloud cluster and thereby reduce the hardware price to a model of BOM cost plus an agreed-upon margin. Yet, this approach is rather different from the traditional approach, whereby network elements are purchased as monolithic devices of hardware and software combined together. As was mentioned above, the hardware part of the problem (i.e., the hardware part of the network elements) was solved by adopting the white-box approach. However, by adopting this approach, new challenges for the software part of the solution are created. Since this approach involves multiple software modules and containers, the use of a distributed hardware nodes' solution by using a plurality of hardware white-boxes, requires the software modules and containers to run in synchronization.

Deployment and provisioning processes that are carried out in disaggregated, white box-based virtual clusters, impose several operational challenges. One such challenge, resides in the fact that several modular networking elements (nodes) are bundled in order for them to function as a single powerful network element. Each one of the nodes is responsible for a dedicated function within the router, and hence needs to be automatically identified, provisioned and assigned with the relevant SW component.

The solution provided by the present disclosure provides a device and a method for identifying the nodes in a dynamic and evolving environment, required for improving the operation of networks such as those described above.

SUMMARY

The disclosure may be summarized by referring to the appended claims.

It is an object of the present disclosure to provide a novel disaggregated system comprising a large number of white boxes that operate effectively as a single entity (router, switch, etc.) while the functionality associated with that single entity is distributed over a plurality of physical white boxes.

It is an object of the present disclosure to provide a novel disaggregated system and a method for identifying elements included in that system based on their functionalities.

It is another object of the present disclosure to provide a novel approach for nodes' identification in a distributed cluster to enable improved control and operation of a network cloud.

Other objects of the present disclosure will become apparent from the following description.

According to a first embodiment of the present disclosure there is provided a disaggregated routing system for use in a communication network comprising a plurality of white boxes, wherein at least four of the plurality of white boxes are each configured to carry out a functionality different from the functionality which the other three of the at least four of the plurality of white boxes are configured to carry out, and wherein each of the at least four of the plurality of white boxes is associated with an identification based on its functionality.

The term "cluster" as used herein throughout the specification and claims is used to denote a virtual entity that comprises a plurality of nodes, among which are one or more element controller(s), management switch(es), fabric module(s) and data path forwarder(s). These nodes operate as a set of loosely or tightly connected computing entities work together so that, in many respects, they can be viewed as single entity.

According to another embodiment, at least some of the white boxes are further identified based on their respective location within the disaggregated routing system.

In accordance with another embodiment, the functionalities of each of the at least four of said plurality of white boxes is selected from among a group that consists of: data path forwarding, fabric module, elements' controller and management switching.

According to another aspect of the disclosure there is provided a method for use in a disaggregated routing system comprising a plurality of white boxes, for identifying each of the plurality of white boxes based on the functionalities which each of the plurality of white boxes is configured to carry out within the disaggregated routing system, wherein at least four of the plurality of the white boxes are each configured to carry out a functionality different from the functionalities which the other three of the at least four of the plurality of white boxes are configured to carry, and wherein each of the at least four of the plurality of white boxes is identified based on its functionality.

In accordance with another embodiment, the method provided comprises the steps of:
identifying at least one of the plurality of white boxes which is configured to act as an elements' controller;
identifying at least one of the plurality of white boxes which is configured to act as a management switch;
identifying at least one of the plurality of white boxes which is configured to act as fabric module; and
identifying at least one of the plurality of white boxes which is configured to act as a data path forwarding element.

By yet another embodiment, one or more of the identifying steps are based on information retrieved by using a Link Layer Discovery Protocol (LLDP).

According to still another embodiment, the step of identifying at least one of the plurality of white boxes as a node configured to act as an elements' controller, is carried out by a network orchestrator according the respective white box serial number.

In accordance with another embodiment, the step of identifying at least one of the plurality of white boxes as a node which is configured to act as a management switch, is carried out in accordance with a connectivity that exists between a respective white box and one or more adjacent white boxes acting as ECs, irrespective of whether the respective white box is connected directly or remotely to their adjacent ECs. Preferably, the identification is based on at least one connected port according to a connectivity matrix stored at an adjacent EC.

According to still another embodiment, the step of identifying at least one of the plurality of white boxes as a node which is configured to act as a fabric module is carried out by generating its identification according to its internal management connection to the management switch. Preferably, the identification is based at least one connected port according to a connectivity matrix stored at the management switch.

By yet another embodiment the step of identifying at least one of the plurality of white boxes as a node which is configured to act as a data path forwarder is carried out by generating an ID of the data path forwarder according to its internal management connection to the management switch.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Figure 1:
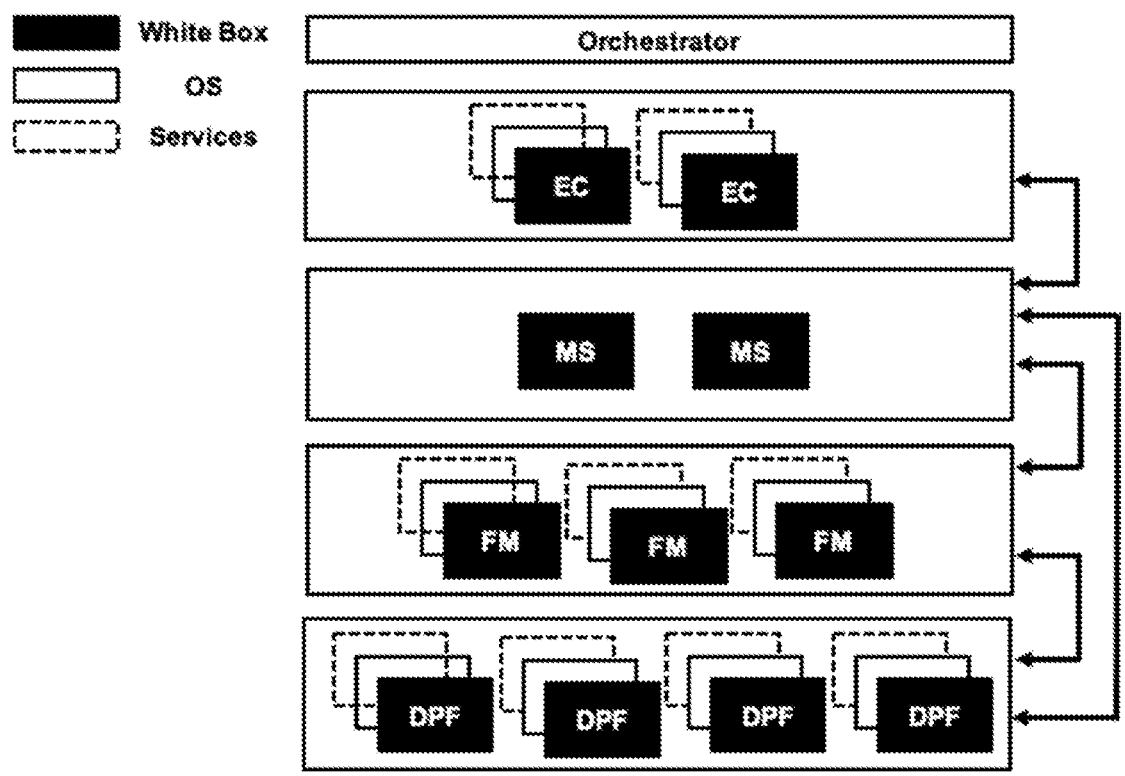
FIG. 1 illustrates an example of a network cloud (NC) with various elements comprised therein, wherein each node in the cluster requires to be identified separately from the others.

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps that are carried out, not all of which are required in all embodiments of the invention. The scope of the invention can be summarized by referring to the appended claims.

The present disclosure relates to a disaggregated routing system (e.g. a distributed cluster), which comprises a large number of network elements, where most (or all) of these network elements are white boxes. Using such a configuration enables on one hand to implement a very large system (i.e., a system having a large capacity) at a relatively low price and on the other hand, to easily expand the system by further adding new white boxes. Yet, one of the main disadvantages in implementing such a system is its complexity. In order for the network cloud to operate properly, the present disclosure proposes to identify each white box functionality and preferably together with its location within the network cloud.

The present disclosure describes a novel approach for identification of while boxes (nodes) included in a disaggregated routing system (e.g., a distributed cluster) wherein each of the white boxes is configured to carry out a certain functionality, such as controlling, for maintaining and operating a powerful network cloud, and by joining their functionalities, it is possible to carry out various networking functions such as routing and switching in the network cloud.

Let us begin by describing the general architecture of a network cloud (NC) and its fundamental building blocks.

The NC is relatively a new network architecture, built for extreme growth, rapid service innovation and economic profitability. Typically, it is comprised of three levels of disaggregation:

1. Hardware and software: software that runs over whiteboxes which are sold directly to cloud services providers (CSPs) by their manufacturer at a cost+ model. This new economic model allows CSPs to increase their profitability as service demand grows.
2. Router architecture: Implementing a network cloud architecture, means that the traditional monolithic router is disaggregated to a cluster built from whiteboxes and standard servers that run routing services. This architecture can scale up from small routers to edge, aggregation, and large core routers while still using the same hardware solution. This approach simplifies the operations and consequently, reduces operational expenses.
3. Data plane and control plane: the network cloud's data plane runs on white-boxes and is designed to be scaled linearly by simply adding further white-boxes. The control-plane should usually be based on containerized microservices that run different routing services for different network functions (Core, Edge, Aggregation, etc.), where they are co-located, service-chaining allows sharing the same infrastructure for all router services.

The network cloud comprises the following software building blocks:
1) An operating system that transforms non-operative (lifeless) boxes into operative (live) network elements. It is scalable from supporting a single standalone white-box to supporting hundreds of white-boxes, thereby generating a true cloud environment in the service provider's network.
2) An orchestrator designed to address the unique challenges of deploying, integrating and managing of a disaggregated network. This block enables to centrally orchestrate the smooth operation of every network cloud element and maintaining the life cycle management.

Next, a Network Cloud Router (NCR) is formed by using various white boxes (hardware building blocks) that have the following functionalities:

Data Path Forwarder (DPF)—a single high rate forwarding element which is responsible for the data-path traffic forwarding process and for storing all relevant data-path features such as access-lists, QOS, BFD, and Netflow.

Fabric Module (FM)—responsible for non-blocking intracluster data-path connectivity between a plurality of DPFs included in a cluster.

Elements' Controller (EC)—an external controller for intra-cluster management and network element control and management. A single x86 server for example, may be used for serving different collocated NCRs.

Management Switch (MS)—responsible for intra-cluster management and control connectivity between DPF, FM and the EC. The MSs from all racks collect all the management traffic information from all the rack elements. The management traffic is then aggregated by the MS of the x86 server rack.

One of the challenges in implementing such a configuration is, how to enable accessing each one of HW building blocks, i.e., in order to operate the cluster properly, how to identify each of the HW building blocks in order to ensure that the desired network functionality is attained.

In the following example, a flow for cluster formation procedure is demonstrated, wherein each of the NC HW building blocks is identified as well as their inter-dependencies. The flow exemplified comprises the following main steps:
EC IDs allocation;
MS Name allocation;
FM IDs allocation; and
DPF IDs allocation.

As a general assumption, let us assume that an MS, as depicted in FIG. 1, must be connected to a node element (DPF/FM), while an EC may be active without having a connection to an MS for pre provisioning purposes.

FIG. 1 illustrates a schematic view of a system construed in accordance with the present invention, comprising different white boxes operating as MS, EC, DPF or FM, operating system (OS) associated with the respective white boxes and respective services carried by these white boxes in accordance with their functionality.

Figure 2:
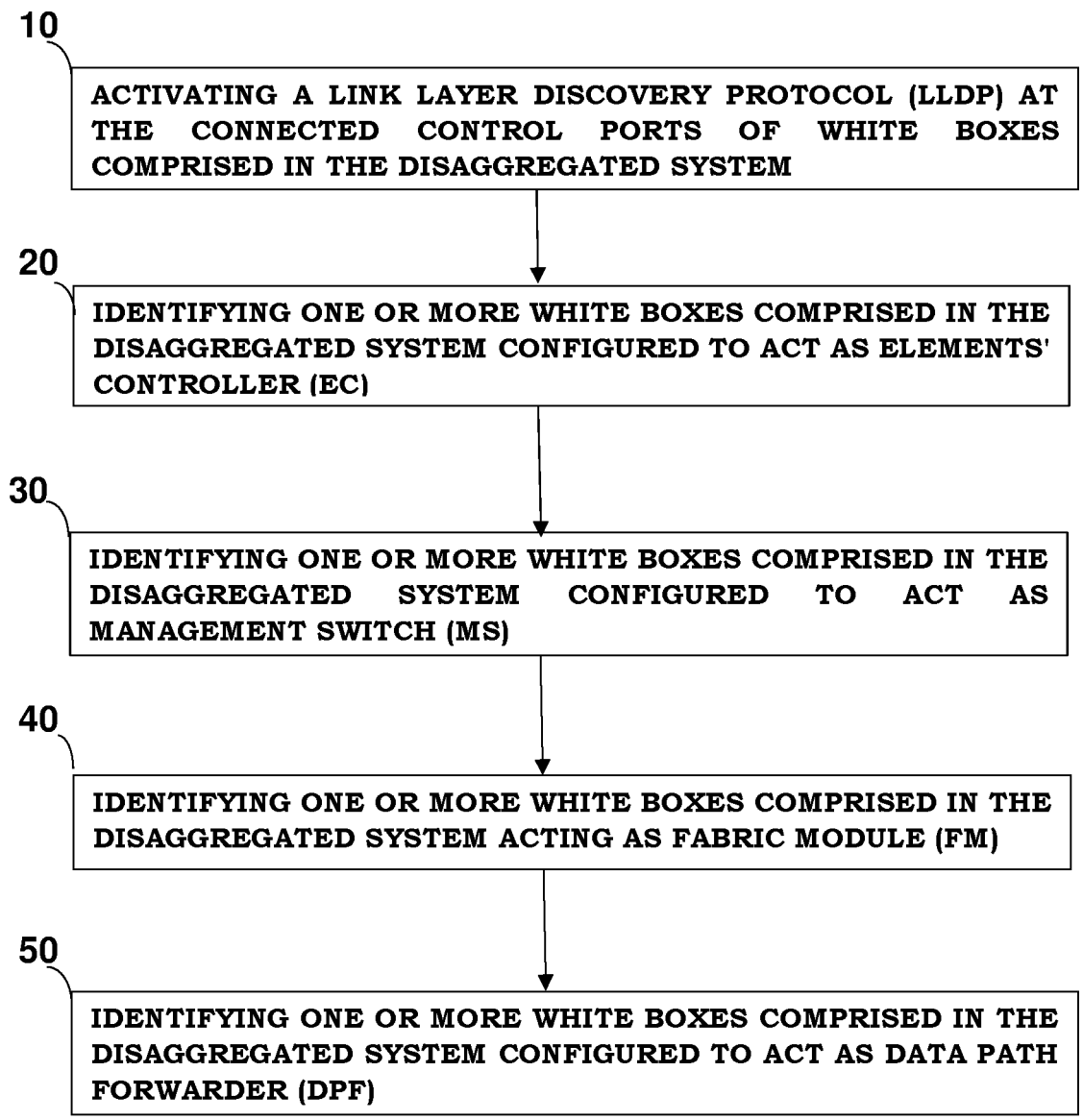
FIG. 2 exemplifies a method construed in accordance with an embodiment of the present invention for carrying out the identification process of white boxes included in a disaggregated system.

FIG. 2 exemplifies a method construed in accordance with an embodiment of the present invention for carrying out the identification process of white boxes included in a disaggregated system.

First, the various white boxes operating as MS, EC, DPF or FM activate continuously a Link Layer Discovery Protocol (LLDP) at their connected control ports (step 10).

Now, starting with the identification of the Elements' Controller (EC) (step 20), in this example this identification is done via the network orchestrator according to the serial number of the white box(es) configured to act as an EC. Assuming that for high availability purposes it is decided that two white boxes comprised in the disaggregated system will be used as ECs, then ID 0 may be allocated (e.g., by default) to the preferred EC, while ID 1 will be allocated to the other EC. Preferably, IDs should not be changed on the fly but only during deployment and remain fixed thereafter.

Next, let us consider the step of identifying the Management Switch (MS) (step 30). Its host/system name will be determined in accordance with its connectivity to its adjacent ECs. The EC may configure the MS through its shell prompt via REST-API, i.e., Representational State Transfer (REST), being a set of rules followed when creating the relevant APIs. MSs may be directly or remotely connected to their adjacent EC. The identification criteria are based on at least one connected port according to a connectivity matrix defined at the EC. Following is an example of a typical process flow:

The EC is provided with information concerning the MSs' serial number (S/N) and their allocated IP addresses (e.g., the DHCP server of the EC may be used to extract the IP address from the MS serial number);

The EC sends queries repeatedly (e.g., every few minutes) to the allocated DHCP IP address, requesting to be informed about the MS neighbors.

Meanwhile, the MS runs the LLDP and obtains information regarding its own neighbors.

The MS responds to the EC query by providing the requested information that was obtained while running the LLDP.

The EC compares the information retrieved from the MS response with its Connectivity Matrix and configures the responding MS (e.g. S/N ABCDEFGH) name, say as "MS-A0", via REST-API.

Next, the EC stores the configured name in its operational database with information that pertains to that MS.

Next, the step of identifying the disaggregated system's (cluster) Fabric Module (FM) (step 40) is carried out. The ID of the FM will be generated automatically and be allocated to the FM according to its internal management connection to the MS, by using a protocol such as the LLDP. An identification criterion may be at least one connected port according to the MS connectivity matrix. Other factors that may be considered while taking this decision such as for example potential collisions and differentiation between startup mode in which a new ID will not be allocated (only serial number information will be available) and operational mode.

The following example demonstrates an embodiment for the latter case:

The FM provides information by using LLDP that it is connected to "MS-XXX" via port ID 'YY'

The EC retrieves the following data from the information provided by the FM:
Node type: FM.
Serial number of the FM.
Connected ports to the MS: "MS-A0" with port ID 'ZZ'.

The EC then compares the retrieved data with data stored at its connectivity matrix and allocates an ID 'TT' to the FM node.

The last type of white boxes which needs to be identified is the Data Path Forwarder (DPF) type of node (step 50). The ID of the PDF will be generated automatically according to its internal management connection to the MS while the identification will be carried out by using LLDP.

An identification criterion which may be used is the use of at least one connected port according to the MS connectivity matrix. Other factors that may be considered while taking this decision are for example potential collisions and differentiation between startup mode in which a new ID will not be allocated (only serial number information will be available) and operational mode. The following example demonstrates an embodiment for the latter case:
Node type: DPF.
Serial Number of the DPF.
Connected ports.

Another important parameter that should preferably be taken into consideration is the number of ports that should be correctly connected in order to activate the DPF.

Now, the EC compares the retrieved data with data stored at the connectivity matrix, finds compatibility with the number of connected ports based on a pre-defined threshold, and allocates the DPF ID to that node.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A disaggregated routing system for use in a communication network comprising a plurality of white boxes, wherein at least four of said plurality of white boxes are each configured to carry out a functionality different from the functionality which the other three of the at least four of said plurality of white boxes are configured to carry out, and wherein each of the at least four of said plurality of white boxes is provided with an identification based on its functionality.

2. The disaggregated routing system of claim 1, wherein at least some of the white boxes are further identified based on their respective location within the disaggregated routing system.

3. The disaggregated routing system of claim 1, wherein the functionalities of each of the at least four of said plurality of white boxes is selected from among a group that consists of: data path forwarding, a fabric module, elements' controller and management switching.

4. A method for use in a disaggregated routing system comprising a plurality of white boxes for identifying each of said plurality of white boxes based on the functionalities which each of said plurality of white boxes is configured to carry out, wherein at least four of said plurality of white boxes are each configured to carry out a functionality different from the functionalities which the other three of the at least four of said plurality of white boxes are configured to carry out, and wherein each of the at least four of said plurality of white boxes is identified based on its functionality.

5. The method of claim 4, which comprises the steps of:
identifying at least one of said plurality of white boxes as a node which is configured to act as an elements' controller;
identifying at least one of said plurality of white boxes as a node which is configured to act as a management switch;
identifying at least one of said plurality of white boxes as a node which is configured to act as a fabric module; and
identifying at least one of said plurality of white boxes as a node which is configured to act as a data path forwarding element.

6. The method of claim 5, wherein one or more of the identifying steps are based on information retrieved by using Link Layer Discovery Protocol.

7. The method of claim 5, wherein the step of identifying at least one of said plurality of white boxes as a node which is configured to act as said element's controller, is carried out by a network orchestrator according to a respective white box serial number.

8. The method of claim 7, wherein the step of identifying at least one of said plurality of white boxes as a node which is configured to act as a management switch, is carried out in accordance with a connectivity that exists between the at least one of the plurality of white boxes configured to act as a management switch and its between one or more adjacent white boxes acting as ECs, irrespective of whether the at least one white box acting as a management switch is connected directly or remotely to their adjacent ECs.

9. The method of claim 8, wherein said identification is based on at least one connected port according to a connectivity matrix stored at an adjacent EC.

10. The method of claim 7, wherein the step of identifying at least one of said plurality of white boxes as a node which is configured to act as said fabric module is affected by generating its identification according to its internal management connection to the management switch.

11. The method of claim 10, wherein said identification is based on at least one connected port according to a connectivity matrix stored at the management switch.

12. The method of claim 7, wherein the step of identifying at least one of said plurality of white boxes as a node which is configured to act as a data path forwarder is affected by generating an ID of the data path forwarder according to its internal management connection to the management switch.

* * * * *